Dec. 9, 1969 L. J. ZENT 3,482,811
DEVICE FOR MOUNTING A MIRROR ON AN AUTOMOBILE
Filed July 12, 1967 4 Sheets-Sheet 1

INVENTOR
LAWSON J. ZENT
BY Jeffers and Young
ATTORNEYS

Dec. 9, 1969   L. J. ZENT   3,482,811
DEVICE FOR MOUNTING A MIRROR ON AN AUTOMOBILE
Filed July 12, 1967   4 Sheets-Sheet 2
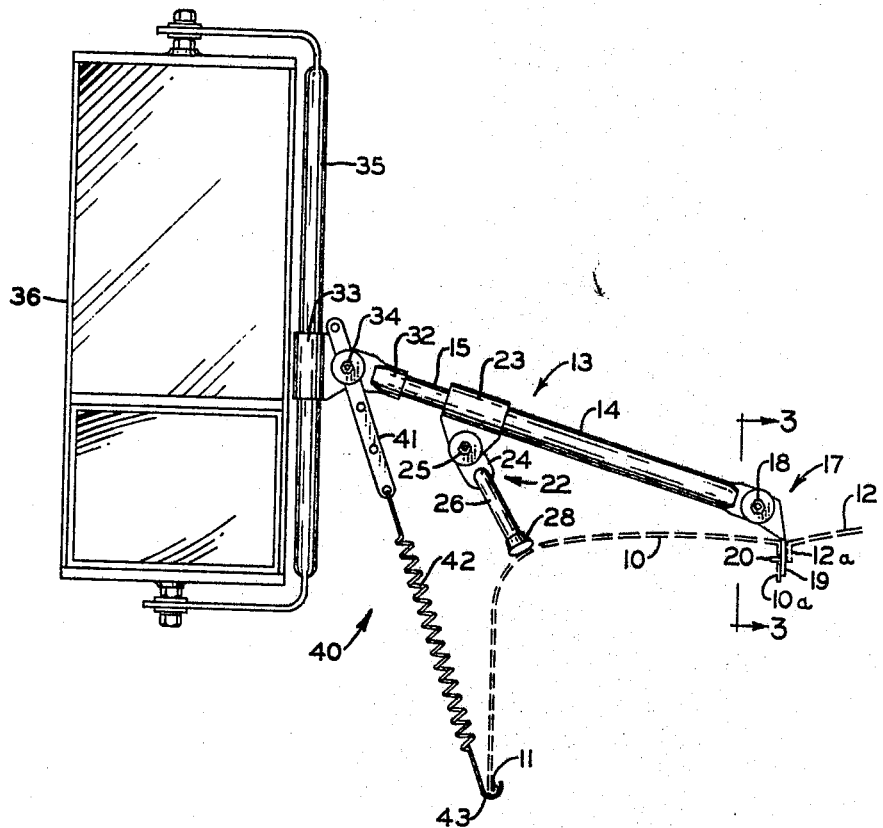
FIG—2
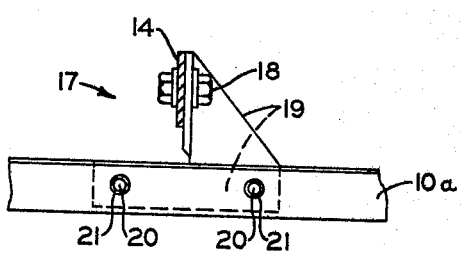
FIG—3
INVENTOR
LAWSON J. ZENT
BY Jeffers and Young
ATTORNEYS Dec. 9, 1969 L. J. ZENT 3,482,811
DEVICE FOR MOUNTING A MIRROR ON AN AUTOMOBILE
Filed July 12, 1967 4 Sheets-Sheet 3
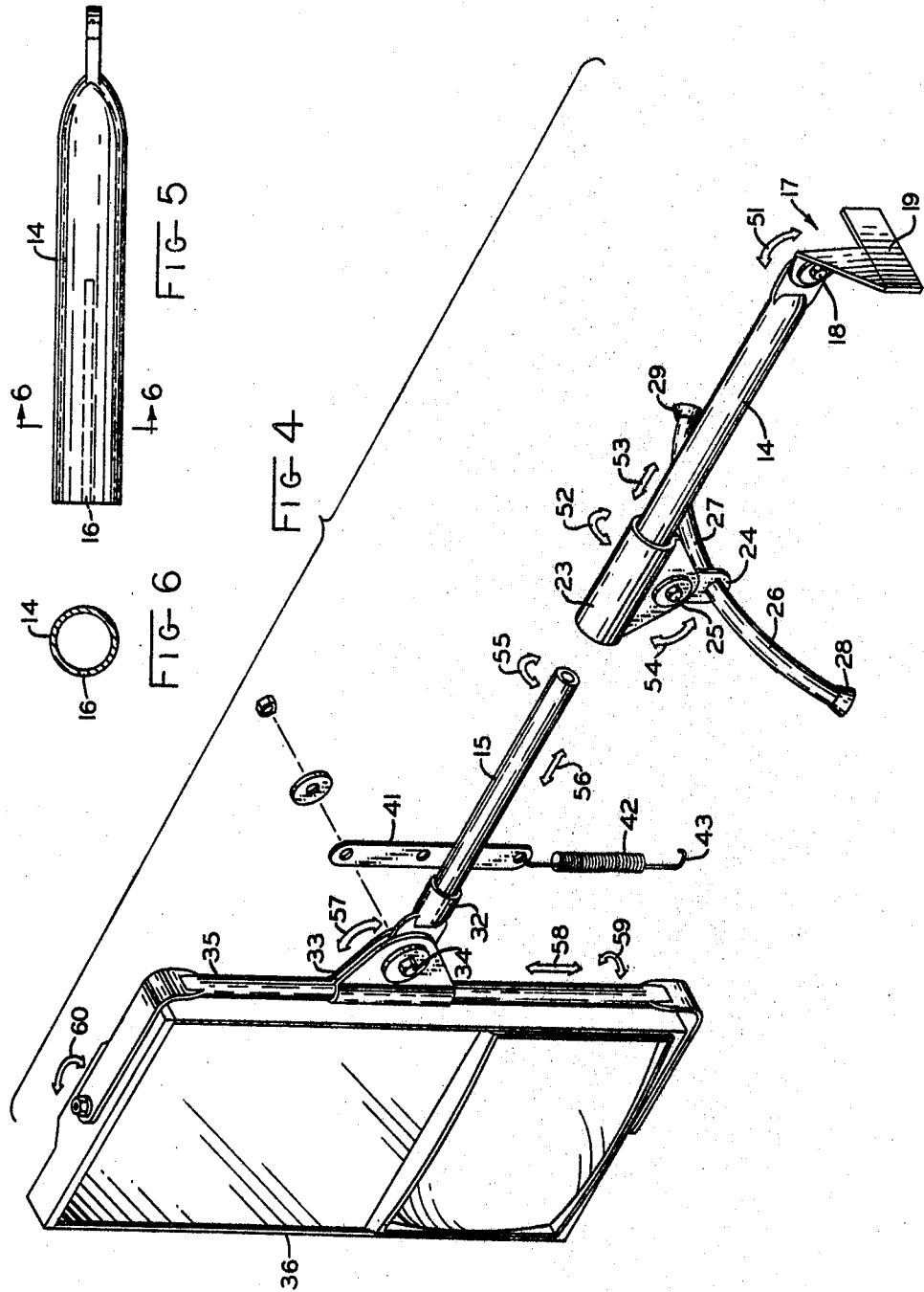
INVENTOR
LAWSON J. ZENT
BY Jeffers and Young
ATTORNEYS

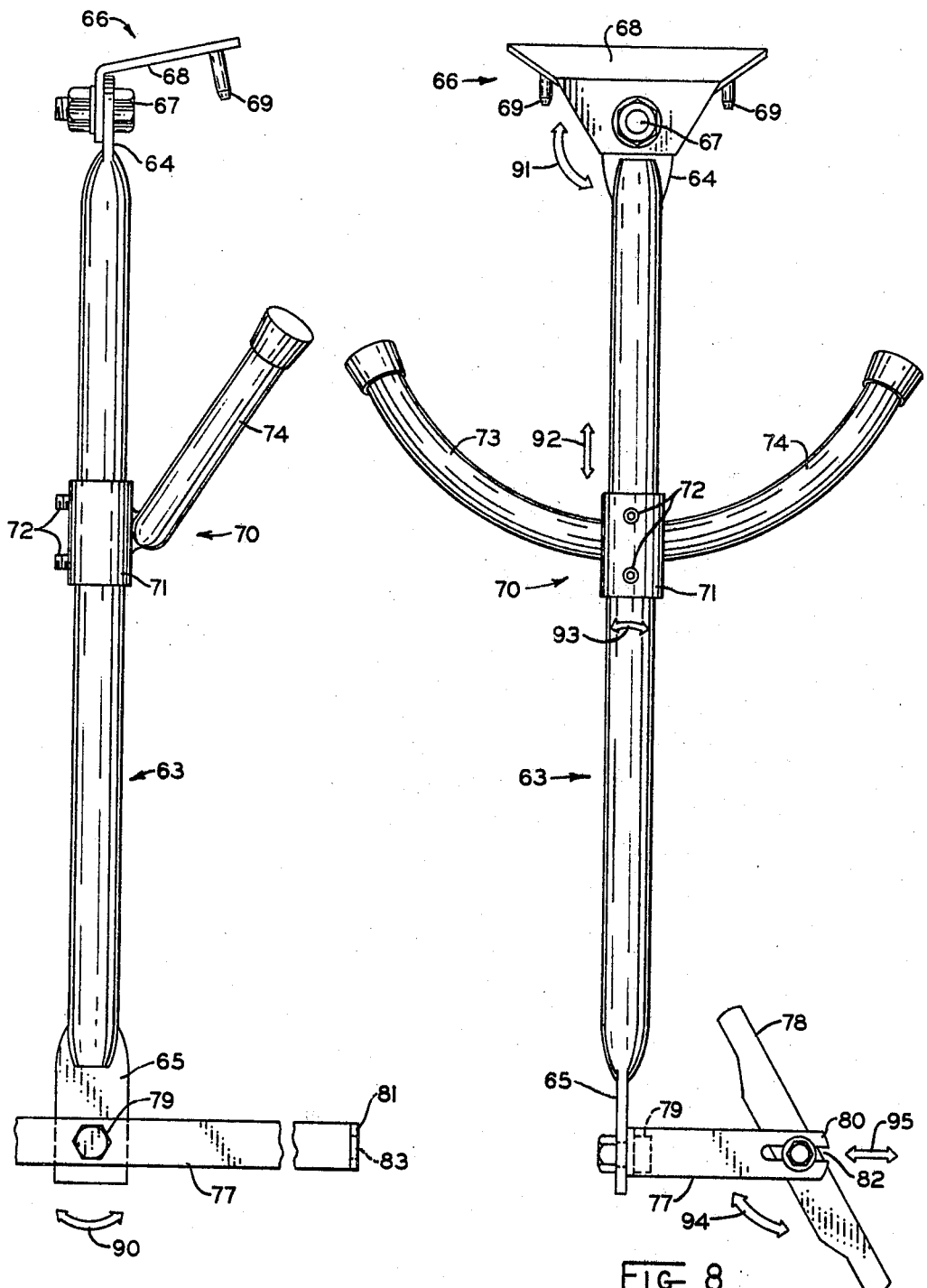

United States Patent Office 3,482,811
Patented Dec. 9, 1969

3,482,811
DEVICE FOR MOUNTING A MIRROR ON AN AUTOMOBILE
Lawson J. Zent, 1430 Etna Ave.,
Huntington, Ind. 46750
Filed July 12, 1967, Ser. No. 652,966
Int. Cl. B60r 1/06
U.S. Cl. 248—480                                    8 Claims

ABSTRACT OF THE DISCLOSURE

A main arm having a mirror at one end is attached at its other end to an automobile near the junction of a front fender and hood. A support arm is attached to the main arm between its ends, and rests on the fender. A tension device is attached between the main arm and the fender to secure the device.

BACKGROUND OF THE INVENTION

My invention relates to a device for mounting a mirror on an automobile, and particularly to such a device for mounting a side view mirror on a front fender of an automobile.

When a trailer is towed behind a passenger automobile, it is usually necessary to add one or more side view mirrors so that the automobile driver has a safe and clear view of the road at the rear of his automobile. In order to provide this safe and clear rear view, the mirror should be relatively large and should be positioned at a location relatively far out from the automobile. Such a mirror size and location require a relatively large mounting device. Previous mirror mounting devices have been built in a relatively strong permanently mounted form with its attendant holes and brackets. However, this permanent form mars the appearance of the automobile when the brackets and structure are removed to leave visible mounting holes and marks in the finished parts of the automobile. For this reason, previous mirror mounting devices have also been built in a temporarily mounted form which can be easily attached to and removed from an automobile without marring the visible parts of the automobile. However, this temporary form is not as strong as the permanent form, and does not hold the adjustment of the mirror as well. In addition, the temporary form may not fit a particular model of automobile.

Accordingly, an object of my invention is to provide an improved device for mounting a mirror on a passenger automobile or motor vehicle.

Another object of my invention is to provide a device which can be easily attached to and removed from a passenger automobile or motor vehicle for rigidly and securely mounting or holding a side view mirror.

Another object of my invention is to provide a mirror mounting device which is relatively strong and which can be securely attached to a motor vehicle without marring or drilling visible or finished surfaces of the motor vehicle.

Another object of my invention is to provide a mirror mounting device which can be easily adjusted to fit a relatively large variety of automobile shapes and models, and which can securely hold a mirror at the desired or best location for rear viewing.

Another object of my invention is to provide an improved mirror mounting device having a structure and plurality of adjustments which permit the device to be positioned and securely mounted on almost any automobile, and which require only two drilled holes at a location under the automobile hood.

Another object of my invention is to provide an automobile mirror mounting device which has relatively few parts and a simple construction that are relatively inexpensive to manufacture.

Another object of my invention is to provide an improved mirror mounting device having an adjustable structure which permits the device to be easily and quickly mounted on an automobile, which permits the device to be easily and quickly removed from the automobile, and which permits the device to be compactly arranged for storage.

SUMMARY OF THE INVENTION

Briefly, these and other objects are achieved in accordance with my invention by a mirror mounting device having a main arm which has a mirror movably attached on one end and a pivotal attachment mounted on its other end. The pivotal attachment is in the form of a bracket which has two pins that fit into two holes drilled in the automobile structure under the hood. A support arm is adjustably fastened to the main arm between its ends. The support arm has feet or bumpers which rest on the automobile fender to hold the main arm at the desired location. A tension spring is fastened to the main arm near its one end, and extends downward and terminates in a hook or clip. The mounting device is mounted by fitting the two pins in their respective holes and permitting the support arm and feet to rest on the automobile fender. With the pivotal attachment acting as a fulcrum, the main arm is pulled downward against the support arm by hooking the hook or clip under the fender rim or edge. The main arm is thus held at its pivotal attachment, and the tension spring pulls the arm downward against the support arm to provide a rigid structure for holding the mirror. The pivotal attachment, the support arm and feet, the tension spring, and the mirror attachment all permit adjustment of the mounting device so that it may fit almost any automobile and hold the mirror at any desired location.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIGURE 2 shows a rear elevation view of my mirror mounting device mounted on the fender of an automobile;

FIGURE 3 shows a more detailed view of the pivotal attachment taken along the lines 3—3 in FIGURE 2;

FIGURE 4 shows an exploded perspective view of my mirror mounting device;

FIGURE 5 shows an enlarged top view of a portion of the telescoping main arm;

FIGURE 6 shows a cross-sectional view of the portion of the arm taken along the lines 6—6 in FIGURE 5;

FIGURE 7 shows a rear elevation view of another embodiment of my mirror mounting device; and FIGURE 8 shows a top plan view of the mirror mounting device of FIGURE 7.

DESCRIPTION OF THE PREFERRED EMBODIMENTS

Figure 1:
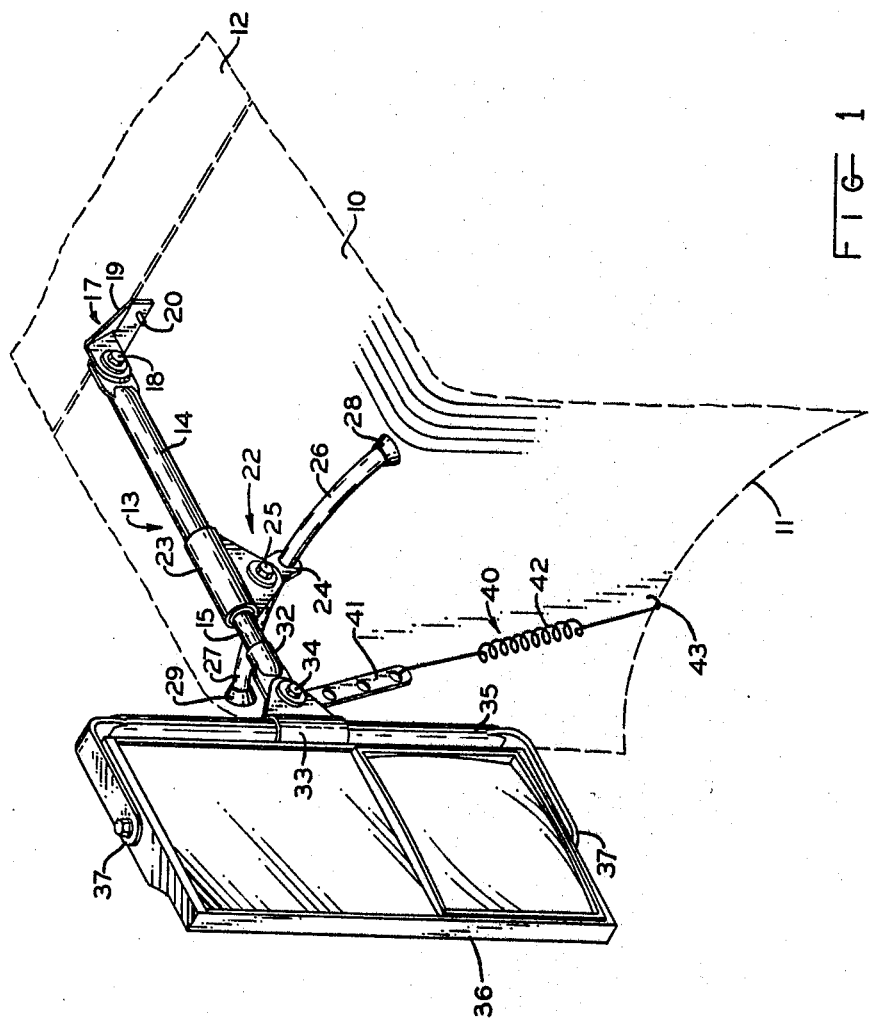
FIGURE 1 shows a perspective view, taken from above and the rear, of a mirror mounting device mounted on an automobile fender, in accordance with my invention.

With reference to FIGURE 1, I have shown a perspective view of my mirror mounting device mounted on an automobile front fender 10, partially shown in dashed lines. A typical fender such as the fender 10 has the curved shape shown, and terminates in a rim or lip portion 11 near a front wheel. A portion of the hood 12 is also indicated. My mirror mounting device comprises a main arm 13 which is preferably formed of a cylindrical metallic pipe. The main arm 13 has a female portion 14 which receives a telescoping male portion 15. One end of the female portion 14 is flattened and drilled so that a metallic pivotal attachment 17 may be pivotally fastened to the female portion 14 by suitable fastening means such as a bolt or machine screw 18 and nut. When the bolt 18 is loosened, the main arm 13 may be pivoted about the axis of the bolt 18. The pivotal bracket or attachment 17 has a plate 19 which, in turn, has two pins 20 extending therefrom. The pins 20 fit into holes or openings drilled into the internal structure of the fender 10 beneath the hood 12 so that these holes are not visible from the outside of the automobile, and do not mar or damage the finished surface of the automobile.

A metallic support arm 22 is attached to the other end of the female portion 14 to provide support for the main arm 13. The support arm 22 is attached by an encircling clamp or collar 23. A metallic foot bracket 24 is attached to the clamp or collar 23 by a suitable bolt or machine screw 25 and nut. When the bolt or machine screw 25 is loosened, the clamp or collar 23 may be pivoted about the longitudinal axis of the main arm 13. Also, when the bolt 25 is loosened, the male portion 15 may be moved into or out of the female portion 14, and may be pivoted about the longitudinal axis of the main arm 13. Also when the bolt 25 is loosened, the foot bracket 24 may be pivoted about the axis of the bolt 25. Two feet 26, 27 in the form of an arcuate or curved metallic pipe are attached to the foot bracket 24 by any suitable means, such as welding. The feet 26, 27 are preferably provided with end caps 28, 29 which are made of a suitable soft material such as rubber or plastic so that the feet 26, 27 do not mar or scratch the finished surface of the fender 10.

The outer end of the male portion 15 is provided with a metallic reinforcing cap 32 which is flattened on the end of the male portion 15. If desired, the cap 32 may be omitted and the male portion 15 flattened in the same manner as the end of the female portion 14. A metallic mirror clamp or collar 33 is attached to the cap 32 by any suitable means such as a bolt or machine screw 34 and nut. A metallic U-shaped mirror bracket 35 is held by the clamp or collar 33. This bracket 35 is cylindrical in its vertical portion adjacent the clamp or collar 35, and is flattened near its horizontal ends 37. A mirror 36 is pivotally fastened between the ends 37 so that the mirror 36 can be pivoted about an axis between the ends 37. One of the ends 37 may be slotted to facilitate mounting the mirror 36. The mirror 36 may take any suitable form and size. The particular mirror shown in FIGURE 1 comprises an upper portion which is flat, and a lower portion which is convex so as to provide regular viewing as well as panoramic viewing. However, the selection of a type of mirror or mirrors is a matter of personal preference. When the bolt 34 is loosened, the bracket 35 may be moved up and down and rotated, and the clamp or collar 33 may be pivoted about the axis of the bolt 34.

A tension or holding device 40 is provided to pull the outer end of the main arm 13 in a downward direction against the support arm 22. The tension device 40 comprises an adjusting plate 41 having a plurality of holes. A tension spring 42 has its upper end connected to the lower end of the adjusting plate 41, and has its lower end connected to a separate hook, or shaped in the form of a hook 43 as shown. The hook 43 is designed to fit under and around the lower rim or lip 11 of the fender 10. The tension device 40 is attached to the outer end of the main arm 13 by the bolt or machine screw 34 which passes through a selected one of the holes in the adjusting plate 41.

FIGURE 2 shows a rear elevation view of my mirror mounting device. The view of FIGURE 2 shows how the main arm 13 is pivotally attached by the pivotal attachment 17 to a flange or rim 10a of the fender 10. This flange 10a is usually provided on the fender 10 to attach the fender to other brackets or structure of the automobile (not shown) and to provide a guide or enclosure for the hood 12. A typical automobile hood such as the hood 12 is movable or raisable, either from the front or the rear. When the hood 12 is closed, its flange 12a takes the position shown in FIGURE 2 adjacent or near the fender flange 10a. The flange 10a is drilled with two holes 21 spaced and sized to receive the two pins 20. This construction is shown in FIGURE 3, which is taken generally along the lines 3—3 in FIGURE 2. In FIGURE 3, and also in the perspective view of FIGURE 4, it will be seen that the plate 19 forming the pivotal attachment 17 has an upper portion which is triangular in shape and a lower portion which is rectangular in shape. A part of the triangular portion is bent at right angles to the surface of the plate and drilled with a hole which receives the bolt 18.

When the mirror mounting device is first mounted, it may be rested on the hood 12 and fender 10 to determine the best location. The two holes 21 are then drilled in the flange 10a. These two holes 21 then provide or determine a positive location or position for the pivotal attachment 17, and make subsequent mountings of the device relatively simple with substantially no adjustment. With reference to FIGURES 2 and 3, when the pivotal attachment 17 is mounted with its pins 20 in their respective holes 21, the hood flange 12a holds the plate 19 against the fender flange 10a so the pins 20 cannot move out of their holes 21. The plate 19 is made relatively thin, so that the hood flange 12a may be moved to its closed position and clear or past the plate 19 without being scratched or displaced when it is in the closed position. The main arm 13 extends generally outward and usually, but not necessarily, upward from the hood 12. The main arm 13 is firmly and securely supported by the support arm 22. The clamp or collar 23 forming a part of the support arm 22 is positioned at a suitable location along the length of the main arm 13, and pivoted about the longitudinal axis of the main arm 13 so that the two end caps 28, 29 of the feet 26, 27 rest on the fender 10 at a good point of support. It is usually preferable, but not necessary, that the plane lying along the two feet 26, 27 be perpendicular to the surface of the fender 10 at the point of contact as shown in FIGURE 2. This perpendicular positioning provides good support for the main arm 13. The main arm 13 is firmly clamped or attached by the downword force provided by the tension device 40. The amount of tension can be varied and the distance between the bolt 34 and the fender rim or lip 11 can be compensated for by positioning the desired hole of the adjusting plate 41 on the bolt 34. With the device adjusted and mounted, the bolts 18, 25, 34 are then tightened. The upper unused portion of the plate 41 may be cut off if desired. It is desirable that the tension spring 42 be pulled or tensioned sufficiently hard so that there is an appreciable force exerted on the outer end of the main arm 13. The inner end of the main arm 13 is securely held against this force by the pins 20 in their respective holes 21 even when the hood 12 is raised away from the fender flange 10a. When the mirror mounting device is to be removed, the hook 43 is pulled away from the fender rim or lip 11, and the pins 20 removed from the holes 21. The mirror mounting device is adapted for compact storage.

FIGURE 4 shows a partly exploded view of my mirror mounting device in perspective, and shows further details or features of the various elements or pieces forming my device. The curved or arcuate shape of the pipe or cylindrical element forming the feet 26, 27 is seen in FIGURE 4. This piece forming the feet 26, 27 is preferably welded or rigidly attached to the foot bracket 24. However, the feet 26, 27 may have other forms or shapes, such as a horizontal element with portions extending downwardly at right angles. These downward portions would be provided with the end caps 28, 29. And, the foot bracket 24 may have a longer length than that shown in the drawing. FIGURE 4 also shows a number of arrows that illustrate or show the different adjustments which can be made with my mirror mounting device so that the device can be made to fit almost any automobile, and so that the mirror 36 can be positioned at almost any desired location. The main arm 13 can be pivoted about the bolt 18 as shown by the arrow 51. The clamp or collar 23 with its attached feet 26, 27 can be rotated about the axis of the female portion 14 as shown by the arrow 52, and can be moved along the axis of the female portion 14 as shown by the arrow 53. The foot bracket 24 with its attached feet 26, 27 can be rotated about the bolt 25 as shown by the arrow 54. The male portion 15 of the main arm 13 can be pivoted or rotated about its longitudinal axis as shown by the arrow 55, and can be moved into and out of the female portion 14 as shown by the arrow 56. The clamp or collar 33 and the mirror bracket 35 can be pivoted about the bolt 34 as shown by the arrow 57. And, the mirror bracket 35 and mirror 36 can be moved up and down in the clamp or collar 33 as shown by the arrow 58, and rotated about the verticle portion of the bracket as shown by the arrow 59. And finally, the mirror can be pivoted about the ends of the mirror bracket 35 as shown by the arrow 60. Thus, my mirror mounting device has all the needed adjustments so that it can fit almost any automobile, and so that the mirror 36 can be located in almost any desired position.

FIGURES 5 and 6 show more detailed views of the female portion 14 which forms a part of the main arm 13. In FIGURE 5, it will be seen how the inner end of the female portion 14 is flattened and drilled to receive the bolt 18. A longitudinal slot 16 is positioned in one wall (preferably the lower wall) of the tube forming the female portion 14. This slot 16 permits the wall forming the female portion 14 to be closed or squeezed by the clamp or collar 23 when the bolt 25 is tightened so that the male portion 15 is firmly held in position within the female portion 14 by the clamp or collar 23. The female portion 14 may be provided with a cap similar to the cap 32 if desired, or the male portion 15 may be flattened in the same manner as the female portion 14, depending upon design preference.

FIGURES 7 and 8 show rear elevation and top plan views respectively of another embodiment of my mirror mounting device. This embodiment is a simplified version which does not have the telescoping adjustments of the embodiment shown in FIGURES 1 through 6. The mirror mounting device of FIGURES 7 and 8 has a main arm 63 which may be formed from a single piece of metallic, tubular material. One end 64 of the main arm 63 is flattened to receive a pivotal attachment 66, and the other end 65 is flattened to receive a clamp or collar such as the clamp or collar 33 and mirror 36 shown in the previous figures, or to receive a U-shaped bracket 77 and mirror 78. The planes of the flattened ends 64, 65 are positioned at right angles relative to each other. The pivotal attachment 66 comprises a generally triangular plate 68 that has a portion of its top cut off parallel to its bottom portion, and that is bent to form an obtuse angle as shown in FIGURE 7. The larger or bottom portion of the plate 68 is provided with two pins 69 which can be fitted in the holes in the fender flange as described for the device of FIGURES 1 through 6. The plate 68 is pivotally fastened to the main arm 63 by a bolt or machine screw 67 which may have a nut as shown, or which may be threaded into a tapped hole. A support arm 70 is mounted on the main arm 63 prior to its ends 64, 65 being flattened. The support arm 70 comprises a clamp or collar 71 which fits around the main arm 63 and which may slide therealong. The clamp or collar 71 may be clamped into position at the desired location by means of one or more set screws 72. Two feet 73, 74 having a form similar to that shown in FIGURES 1 through 6 are welded or suitably attached to the clamp or collar 71, and provided with end caps or other similar devices to prevent scratching or marring of the automobile fender. The mounting device shown in FIGURES 7 and 8 has a fixed length, but is adjustable at its pivotal attachment 66, and is also adjustable at its clamp or collar 71 which locates the feet 73, 74 at the desired point along the main arm 63. The mirror bracket 77 is adjustably fastened to the end 65 of the arm 63 by a bolt 79 and nut. The bracket 77 has generally parallel ends 80, 81. Only the end 81 is shown in FIGURE 7 and only the end 80 is visible in FIGURE 8. These ends 80, 81 are provided with elongated slots 82, 83, and the slot 82 extends to the outer edge of the end 80 so that the mounting bolts for the mirror 78 (not shown in FIGURE 7) can be attached. The slots 82, 83 permit the mirror 78 to be tilted in the same manner as provided by rotating the male portion 15 about its longitudinal axis.

When the mounting device of FIGURES 7 and 8 is mounted, the holes are drilled in the fender flange to receive the pins 69. These pins 69 and the pivotal attachment 66 are positioned, and the main arm 63 is adjusted by means of its pivotal attachment 66 so that it extends at the desired angle relative to the plate 68. Then, the feet 73, 74 are positioned at the desired location by moving the clamp or collar 71 to the desired location along the main arm 63. With the device positioned as desired, the bolt 67 and the set screws 72 are tightened. Then, a tension device such as shown in FIGURES 1 through 6 is attached to the other end 65 and fastened to the fender flange or rim as described in connection with FIGURES 1 through 6. Thus, the mirror mounting device of FIGURES 7 and 8 provides a simplified version of my invention which is less expensive to manufacture, but which provides an adjustment at the pivotal attachment 66 and at the support arm 70. These two adjustments permit my mirror mounting device to be fitted to many models of automobiles. The desired tension is provided by means of a tension device such as the device 40 described in connection with FIGURES 1 through 6. The device of FIGURES 7 and 8 has a plurality of adjustments. The bracket 77 may be rotated about the bolt 79 as shown by the arrow 90. The main arm 63 may be pivoted about the bolt 67 as shown by the arrow 91. The clamp or collar 71 can be slid along and rotated about the main arm 63 as shown by the arrows 92, 93. And, the mirror 78 can be rotated about its mounting bolts as shown by the arrow 94 and tilted in its slots 82, 83 as shown by the arrow 95.

It will thus be seen that my mirror mounting device provides a new and improved structure which permits a mirror to be easily mounted on and removed from an automobile. My mirror mounting device provides a wide range of dimensional and configurational adjustments, and can be made to accommodate or fit almost any type of automobile. My mirror mounting device requires only two mounting holes which are positioned in an interior part of the automobile on the fender flange. Thus, there is no permanent marring or defacing of a visible, finished surface. The finished surface is protected against damage or marring by means of the end caps which I provide on the feet of the support arm. The hook may be covered with soft material to protect the fender 10 and its rim 11 from damage and marring. Persons skilled in the art will appreciate that modifications may be made to my invention. For example, various types of material may be used, although I prefer steel or aluminum because of their strength. While I contemplate that my bolts be provided with lock washers and nuts, bolts may be used which thread into a tapped hole. I have also found that serrations or radial grooves extending outward from the bolt holes along the surface provide a better and firmer gripping action when the bolts are tightened. Also, other tensioning devices may be used in place of the tension spring. Therefore, while my invention has been described with reference to a particular embodiment, it is to be understood that modifications may be made without departing from the spirit of the invention.

What I claim as new and desire to secure by Letters Patent of the United States is:

1. A device for mounting a mirror on an automobile, comprising:
   (a) a main arm;
   (b) a pivotal bracket attached to one end of said main arm, said pivotal bracket having at least one pin that is adapted to fit in an opening in the fender structure of the automobile beneath the hood for positive location of said pivotal bracket of the fender;
   (c) a support arm attached to said main arm intermediate the ends thereof, said support arm having a foot portion adapted to rest on the upper surface of a fender of the automobile;
   (d) a tension spring having one end attached to the other end of said main arm, said tension spring having the other end adapted to be attached to a rim of the fender of the automobile to urge said other end of said main arm downward against said support arm and foot portion when said pivotal bracket pin is positioned in the opening of the fender structure of the automobile;
   (e) and means for attaching a rear view mirror to said other end of said main arm.

2. The device of claim 1 wherein said pivotal bracket comprises a relatively thin plate for positioning between a fender and a hood of an automobile, and is provided with two pins projecting therefrom for enegaging two spaced openings in the fender structure of the automobile.

3. The device of claim 2 wherein said support arm is adjustable relative to said main arm and comprises clamping means for maintaining the adjusted position of said support arm relative to said main arm.

4. A mirror mounting device for automobiles and the like, comprising:
   (a) an elongated main arm;
   (b) an attachment comprising a plate pivotally attached to one end of said main arm, said plate having two pins extending therefrom for fitting in two respective holes in a portiton of the automobile;
   (c) a support arm clamp positioned around said main arm, said support arm clamp having clamping means that can be tightened and loosened;
   (d) a support arm attached to said support arm clamp, said support arm having two feet for resting on a fender of the automobile;
   (e) a mirror bracket pivotally attached to the other end of said main arm for receiving and holding a rear view mirror;
   (f) a tension spring having one end attached to said other end of said main arm;
   (g) and a hook attached to the other end of said tension spring, said hook being adapted to be attached to the rim of an automobile fender for urging said other end of said main arm downward when said feet rest on the fender of the automobile and when said pins are positioned in their respective holes.

5. The device of claim 4 wherein said attachment is provided with means for rigidly clamping said attachment to said main arm after being pivoted to a desired position.

6. The device of claim 4 wherein said mirror bracket is generally U-shaped and has slotted ends to permit a mirror to be tilted, and wherein said mirror bracket is provided with means for rigidly clamping said mirror bracket to said main arm after said mirror bracket is pivoted to a desired position.

7. The device of claim 4 wherein said main arm comprises two telescoping portions and wherein said support arm clamp clamps said two telescoping portions in a fixed relation.

8. The device of claim 7 wherein said attachment is provided with means for rigidly clamping said attachment to said main arm, said support arm is provided with means for rigidly clamping said support arm to said support arm clamp, and said mirror bracket is provided with means for rigidly clamping said mirror bracket to said main arm.

References Cited

UNITED STATES PATENTS

| 3,081,057 | 3/1963  | Farnsworth | 248—480 X |
| 3,114,530 | 12/1963 | Shilling   | 248—226   |
| 3,166,283 | 1/1965  | Farnsworth | 248—485 X |
| 3,172,633 | 3/1965  | Allen      | 248—226   |
| 3,395,883 | 8/1968  | Murgas     | 248—480   |

ROY D. FRAZIER, Primary Examiner

FRANK DOMOTOR, Assistant Examiner

U.S. Cl. X.R.

248—485